Sept. 10, 1929.  J. KUBLER  1,727,834

RECTIFYING SYSTEM

Filed April 30, 1921

Inventor
J. Kubler,
By Marks Clerk
Attys.

Patented Sept. 10, 1929.

1,727,834

UNITED STATES PATENT OFFICE.

JOHANN KUBLER, OF BADEN, SWITZERLAND, ASSIGNOR TO AKTIENGESELLSCHAFT BROWN, BOVERI & CIE., OF BADEN, SWITZERLAND.

RECTIFYING SYSTEM.

Application filed April 30, 1921, Serial No. 465,944, and in Switzerland May 15, 1920.

This invention relates to rectifier systems and it has particular relation to apparatus for suppressing harmonic currents from the direct current circuits of said systems.

Among the objects of the invention is the provision of an improved system of the foregoing character providing for the compensation of the variations of the permeability of the magnetic core means utilized in the reactors or impedances connected in said direct current circuits for suppressing the harmonics.

The objects of the invention will be best understood from the following description of exemplifications thereof. In the accompanying drawings, Fig. 1 is a circuit diagram of a conventional rectifier system of the prior art;

Figure 1:
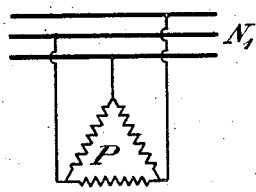

In order to remove the ripples or higher harmonics from currents derived from rectifiers it has been proposed to insert a reactor or choke coil in the direct-current circuit of such rectifiers so as to provide a large impedance to the flow of such harmonic currents while leaving the direct current flow substantially unobstructed. Such system is shown in Figure 1 wherein a mercury-vapor rectifier G is arranged to be supplied by a polyphase transformer T from a three-phase line $N_1$. The secondary windings S of the transformer are connected to the three anodes $A_1$, $A_2$, $A_3$, of the rectifier. A direct current load, represented by a resistor $r$, is connected between the cathode K of the rectifier and the neutral point of the star-connected secondary windings S. Included in series with the direct current load is a reactor or choke coil L to impede the flow of ripples or harmonic currents incident to the three-phase rectification while permitting substantially free flow of the direct current into the said load resistor $r$.

In order to secure the desired high inductivity necessary for effectively impeding the flow of harmonic currents, the choke coil or inductance means L must have a core of iron, or, in general, of a magnetic material of high permeability. The core materials of high permeability introduce, however, a complication in the operation of such choke coil or impedance means on account of the variation of the permeability with the degree of induction of the core, or in other words, the saturation characteristics of such materials. As a result, the action of such choking coils in impeding the flow of the harmonic currents depends to an extraordinary degree upon the magnitude of the load, since the direct current upon which the harmonic currents are impressed varies the saturation of the cores and, as a result, changes the inductivity of the choke coil means. Thus, when the load is large and the direct current traversing the choke coil windings is great, a high degree of saturation obtains in the core, diminishing the effectiveness of the choking action owing to the smaller variations in the flux that will be induced by the pulsating current component. This will be readily understood by a consideration of the curves in Figures 2 to 5.

Figure 2:
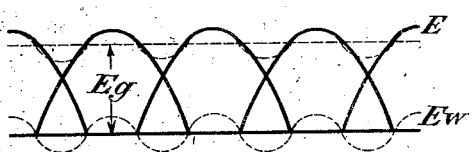
Fig. 2 is a diagram of the direct current voltage wave across the rectifier in Fig. 1.

In Figure 2 the curve E represents the rectified voltage wave across the terminals of a rectifier, such as shown in Figure 1. The resulting voltage E consists of a direct-current component $E_g$ indicated by a horizontal dotted line, and a harmonic component $E_w$ also indicated by a dotted line. Assuming that such rectifier is connected to a purely ohmic load, the direct current derived from the rectifier will have the form shown in Figure 3 and comprise a direct-current component $I_g$ and a harmonic alternating-current component $I_w$. By comparing the ratio of the harmonic component $I_w$ to the direct-current component $I_g$ under various conditions, it is readily possible to determine the effectiveness of particular choke coil or inductance means in suppressing the flow of harmonics. I shall hereinafter designate this ratio of the harmonic component to the direct current component as the harmonic or wave factor $z = I_w/I_g$.

I shall now explain, in a simple way, how the wave factor $z$ of particular choke coil means having an iron core varies with the degree of saturation of such core or with the magnitude of the direct-current load. This explanation will be based on an analysis of the operating conditions of a typical choke coil of the prior art, such analysis being carried out by a method of approximation sufficient for an understanding of the defects of the prior art choke coils and the principles underlying my present invention.

Figure 4:
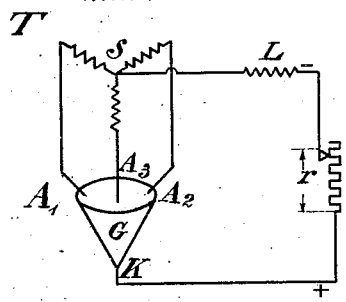
Fig. 4 is a diagram representing the saturation conditions under various load conditions, and the relationship of the characteristics of the system effecting the saturation.
Figure 4:
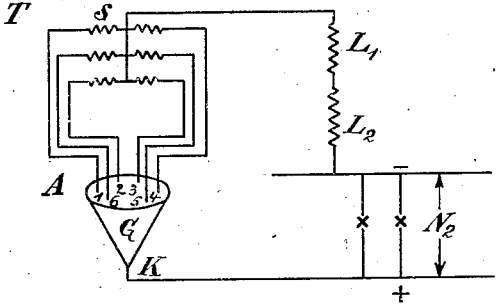
Figure 4:
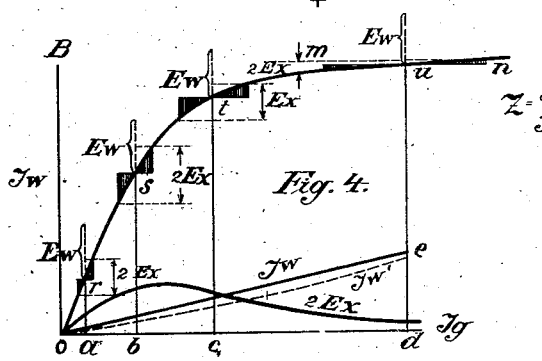

In Figure 4 there is shown a typical saturation curve of an ordinary choke coil, the induction B of the core being plotted against the direct current excitation $I_g$. Assuming, for the present, that the magnitude of the harmonic current component $I_w$ is directly proportional to the magnitude of the direct current $I_g$, the dependence of the harmonic current $I_w$ on the direct current $I_g$ may be represented by a straight line $I_w$ through the origin $o$ of the system of co-ordinates. By drawing ordinates at the points $a$, $b$, $c$, $d$, of the abscissæ axis, we may directly compare the relative effect of the choke coil in opposing the flow of the harmonic currents. The degree of saturation given by the intersection of each of the ordinates with the induction curve at $r$, $s$, $t$, $u$, directly determines the effectiveness of the choke coil in suppressing the harmonic current, the magnitude of which is given by the intersection of the ordinate with the harmonic current curve $I_w$.

If horizontal lines be drawn at the intersection points of the ordinates with the induction curve at $r$, $s$, $t$, $u$, and lengths equal to the corresponding value of the harmonic current $I_w$ be laid off in the positive and negative directions on said horizontal lines, these lengths will represent the exciting ampere turns of the harmonic currents under different load conditions corresponding to the abscissæ points $a$, $b$, $c$, $d$.

The field variation produced by this harmonic current excitation constitutes a measure for the electromotive force of the self-induction $E_x$ which the choking coil exercises in opposing the harmonic voltage component $E_w$ which tends to produce the flow of the harmonic current $I_w$. By drawing vertical lines at the ends of the horizontal line segments laid off at each of the intersection points $r$, $s$, etc., and bringing said vertical lines to intersection with the induction curve, the voltage variations $E_x$ produced by the harmonic current excitation are readily obtained as shown in the drawing. The value of the field variation, induced by the harmonic currents, which may be expressed by the electromotive force of the self-induction $E_x$, will be found to begin at zero, increasing at first with increasing direct current $I_g$, and then diminishing again for higher values of saturation. Accordingly, the influence of the choke coil will be at a maximum at some intermediate value of the direct current $I_g$. This is clearly brought out by the curve $2E_x$ of Figure 4 illustrating the magnitude of the electromotive force induced by the harmonic current pulsation for different values of the direct current flowing through the choke coil.

In the foregoing considerations it was assumed that the harmonic current $I_w$ is dependent on the harmonic voltage component $E_w$ only. However, as a matter of fact, the harmonic current flow is generated by the resultant voltage $(E_w - E_x)$ so that the harmonic curve $I_w$ must be corrected in order to approximate the true conditions. This may be done by diminishing the ordinates of the straight line $I_w$ curve in the proportion of $$I_w \frac{E_w - E_x}{E_w} = I_w'.$$

The corrected curve for the harmonic current $I_w'$ is shown in Figure 4 by a dotted line. This corrected value of the harmonic current $I_w$ is, of course, still an approximation only but it suffices for the explanation of the subject matter of the invention.

Taking now into consideration the corrected value of the harmonic current $I_w'$ we may now express the correct value of the harmonic factor $z$ as $$z = \frac{I_w'}{E_w} = \frac{I_w}{E_w} \cdot \frac{E_w - E_x}{E_w}.$$

Figure 5:
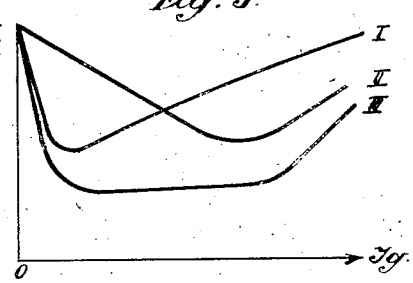
Fig. 5 is a diagram illustrating the effect of the variations of the saturation on the flow of harmonic currents in the direct current system.

In Figure 5 curve I shows the harmonic factor $z$ plotted for different values of the direct current $I_g$, this value being a minimum for one particular load point and being larger for the remainder of the load range. In other words, with the prior art harmonic choking means the full effect of the choking action is not present throughout the full range of the load variations but only within a narrow range of load values.

According to the present invention the harmonic choking means are so arranged as to secure a substantially uniform low harmonic factor for a large portion of the load range and to obtain substantially uniform and relatively high suppression of such harmonic currents throughout the major portions of the load range. To this end, the choke coil means are so designed that the voltage characteristics thereof are such as to have more than one knee bend as compared to a single knee bend of the prior art arrangements.

Figure 6:
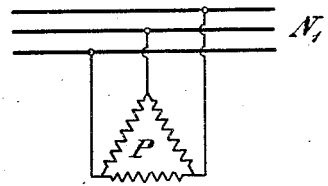
Fig. 6 is a circuit diagram of a rectifier system exemplifying one form of the invention.

In accordance with the invention this may be secured by inserting in the direct current circuit a second choke coil which becomes saturated at higher values of the direct current $I_g$ than the first choke coil means $L_1$. An arrangement of such character not only secures the same harmonic factor for a larger load range but also serves to further diminish such harmonic factor, or, in other words, it reduces the proportion of the harmonic currents with respect to the direct current flowing to the load. Such arrangement is illustrated diagrammatically in Figure 6 wherein the direct current circuit supplied from the rectifier includes, in addition to the load device $N_2$, two choke coils $L_1$, $L_2$, connected in series with the load. The rectifier shown in this instance is of the six-phase type and comprises six anodes, $A_1$ to $A_6$, connected to the end points of a six-phase star secondary winding S of a transformer T, the primary winding P of which is connected in delta to the supply line $N_1$.

In accordance with the invention the two choke coils $L_1$, $L_2$ are so designed that while one choke coil $L_1$ becomes saturated at relatively small load currents, the second choke coil $L_2$ will become saturated only at greater loads. In Figure 5 curve I may be regarded as representing the dependence of the harmonic factor obtained with choke coil $L_1$, while curve II represents the harmonic factor curve for the choke coil $L_2$. The combined effect of the two choke coils $L_1$ and $L_2$, as represented by curves I and II, gives the resultant harmonic factor curve III. This resultant curve III has much smaller ordinates than the component curves I and II and, moreover, has a substantially constant value within the major portion of the load range that comes into practical consideration.

Figure 7:
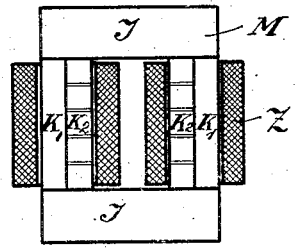
Fig. 7 is a sectional view of a choke coil constructed in accordance with the invention.
Figure 3:
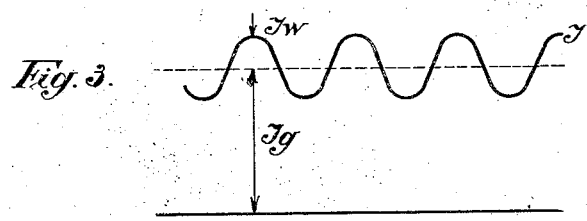
Fig. 3 is a diagram of the current wave of a rectifier.

In the practical construction of choke coils designed to embody the principles of the foregoing invention, the two choke coil effects may be obtained by a single unit arranged to give the effect of a double knee bend in the saturation or induction curve. The first knee bend of the saturation curve of such combined choke coil will then correspond to the commencement of the saturation condition in the first of the aforesaid choke coils $L_1$, whereas the second knee bend will correspond to the commencement of the saturation condition in the second choke coil $L_2$. Such construction is illustrated in Figure 7.

The choke coil has windings Z mounted on a magnetic core M having two sets of parallel core legs $K_1$, $K_2$, interlinked with the windings Z. The core legs $K_1$ and $K_2$ differ from each other in that one is continuous and presents a smaller reluctance to the magnetic flux while the other, $K_2$, is subdivided by air gaps to increase its magnetic reluctance. Because of the greater conductance of the continuous core legs $K_1$ they become saturated sooner than the core legs $K_2$, thus giving the characteristic effect of two knee bends in the induction curve. Such choke coil is thus the equivalent of two series-connected choke coils having different degrees of saturation.

The invention is not limited to the precise details of construction and operation shown and described hereinabove. Instead of the choke coil arrangement described above, other arrangements and combinations of the inductive elements for impeding the harmonic current flow may be provided that result in an effect equivalent to that obtained by the arrangement described above, namely, a uniformity in the suppression of the harmonic currents that is substantially independent of material variations and the value of the load. In other words, in its broad aspects my invention aims to cover arrangements in which special compensating arrangements are provided to offset the effect of the variations of the permeability of the magnetic core material associated with the inductive means used in rectifier systems for suppressing the flow of harmonic currents into the direct current load. It is accordingly desired that the appended claims be given a broad construction commensurate with the scope of the invention within the art.

What I claim is:

1. An apparatus for suppressing the harmonics in the direct current circuit of a rectifier including an inductive winding inserted in the said direct current circuit, having a magnetic core of variable permeability, the total voltage characteristic of said winding having more than one knee bend.

2. An apparatus as claimed in claim 1, wherein the inductive winding is constituted by a choking coil.

3. An apparatus as claimed in claim 1, wherein the inductive winding is constituted by a choking coil comprising two series connected windings, of which one winding is caused by the influence of the load current to reach the knee bend of its saturation curve earlier than the other winding.

4. An apparatus as claimed in claim 1, wherein the inductive winding is constituted by a choking coil wound on two magnetically parallel iron cores having different reluctances.

5. An apparatus as claimed in claim 1, wherein the inductive winding is constituted by a choking coil wound on two magnetically parallel iron cores, one of said cores being subdivided by a plurality of air gaps.

6. The combination of a rectifier, a direct current circuit connected to said rectifier and subject to the flow of harmonic currents, means for impeding the flow of said harmonic currents comprising magnetic core means of variable permeability and windings connected in series with said circuit, together with means for maintaining the potentials of said harmonic currents substantially constant within predetermined limits irrespective of direct current variations in said circuit.

7. The combination of a rectifier, a direct current circuit connected to said rectifier, and subject to the flow of harmonic currents, means for impeding the flow of said harmonic currents comprising magnetic core means of variable permeability and windings connected in series with said circuit, together with means for maintaining the variations in the flow of said harmonic currents substantially constant with respect to variations within predetermined limits in the flow of direct current in said circuit.

8. The combination of a rectifier, a direct current circuit connected to said rectifier and subject to the flow of harmonic currents, means for impeding the flow of said harmonic currents comprising magnetic core means of variable permeability and windings connected in series with said circuit, together with means for varying the impedance to the flow of said harmonic currents in accordance with the variations within predetermined limits in the flow of direct current in said circuit.

9. The combination of a rectifier, a direct current circuit subject to the interposition of harmonic currents, and impedance means for impeding the flow of said harmonic currents in said circuit, said means comprising inductive windings and magnetic core means of variable permeability so associated with said windings as to maintain the potentials of said harmonic currents substantially constant and the impedance to the flow of said harmonic currents substantially in accord with the variations within predetermined limits in the flow of direct current in said circuit.

10. The combination with a rectifying system having in the direct-current output circuit thereof means having a given effective range of operation and being operable to suppress the flow of harmonic currents in said circuit, of means operable to supplement such suppressing action of said first-named means and having a given effective range of operation beyond that of the latter.

11. The combination with a rectifying system having in the direct-current output circuit thereof means having a given effective range of operation and being operable to suppress the flow of harmonic currents in said circuit, of means connected in said circuit and being operable to supplement such suppressing action of said first-named means and having a given effective range of operation beyond that of the latter.

In testimony whereof I have signed my name to this specification.

JOH. KUBLER-WAGNER.